United States Patent
Yosef

(10) Patent No.: US 12,308,785 B2
(45) Date of Patent: May 20, 2025

(54) SOLAR HARVESTING FIELD AND DEVICE FOR SAME

(71) Applicant: Yagel Yosef, Yishi (IL)

(72) Inventor: Yagel Yosef, Yishi (IL)

( * ) Notice: Subject to any disclaimer, the term of this patent is extended or adjusted under 35 U.S.C. 154(b) by 0 days.

(21) Appl. No.: 17/786,160

(22) PCT Filed: Dec. 23, 2020

(86) PCT No.: PCT/IL2020/051328
§ 371 (c)(1),
(2) Date: Jun. 16, 2022

(87) PCT Pub. No.: WO2021/130755
PCT Pub. Date: Jul. 1, 2021

(65) Prior Publication Data
US 2023/0025362 A1    Jan. 26, 2023

(30) Foreign Application Priority Data
Dec. 24, 2019 (IL) .......................... 271679

(51) Int. Cl.
*H02S 20/32* (2014.01)
*H02S 30/10* (2014.01)

(52) U.S. Cl.
CPC .............. *H02S 20/32* (2014.12); *H02S 30/10* (2014.12)

(58) Field of Classification Search
CPC ................................. H02S 20/32; H02S 30/10
See application file for complete search history.

(56) References Cited

U.S. PATENT DOCUMENTS

| | | | |
|---|---|---|---|
| 9,347,692 B2* | 5/2016 | Pizzarello | H02S 30/10 |
| 2010/0212720 A1 | 8/2010 | Meyer et al. | |
| 2011/0067748 A1 | 3/2011 | Pfeiffer | |
| 2017/0353145 A1 | 12/2017 | Yang | |
| 2018/0278201 A1 | 9/2018 | Tehan et al. | |
| 2019/0006984 A1 | 1/2019 | Albertella | |
| 2019/0134822 A1* | 5/2019 | Clemenzi | H02S 20/32 |

FOREIGN PATENT DOCUMENTS

| | | |
|---|---|---|
| CN | 105553386 A | 5/2016 |
| CN | 105827186 A | 8/2016 |
| CN | 206114933 U | 4/2017 |
| CN | 208918346 U | 5/2019 |
| DE | 10047400 A1 | 4/2002 |
| DE | 202006020180 U1 | 12/2007 |
| DE | 202009011880 U1 | 4/2010 |
| JP | 2005005296 * | 1/2005 |
| JP | 2005005296 A | 1/2005 |
| JP | 2014110247 A | 6/2014 |
| WO | WO2018209378 * | 11/2018 |

* cited by examiner

*Primary Examiner* — Jayne L Mershon
(74) *Attorney, Agent, or Firm* — Dorsey & Whitney LLP

(57) ABSTRACT

A photovoltaic system is described. The photovoltaic system comprises a plurality of photovoltaic arrays comprising first, and second groups of photovoltaic arrays arranged in an interleaved fashion within a selected region. Photovoltaic arrays of the first group are mounted with a selected fixed tilt angle, and photovoltaic arrays of the second group are located between photovoltaic arrays of said first ground and mounted with a selectively varying tilt angle, thereby increasing land coverage ratio of said photovoltaic system.

8 Claims, 7 Drawing Sheets

SOLAR HARVESTING FIELD AND DEVICE FOR SAME

TECHNOLOGICAL FIELD

The present invention is in the field of solar harvesting panel mounting and arrangement of solar panels within a field. The invention is generally relevant for improved land coverage ratio.

BACKGROUND

Harvesting solar energy is one of the promising techniques for obtaining energy from renewable sources. The solar emitted electromagnetic radiation can be utilized by collection of electromagnetic radiation arriving from the sun and converting the electromagnetic radiation to other, useable, forms of energy. There are various techniques for conversion of solar energy to electrical energy, of which, photovoltaic solar cells provide promising efficiency. Generally, photovoltaic solar cells are electronic devices the utilize the photoelectric effect and generate current or electrical potential difference in response to collection of electromagnetic radiation impinging thereon.

Photovoltaic power stations (PV power stations or solar fields) act as solar power plants by employing an arrangement of solar panels within a designated region. The solar panels collect solar radiation and convert the radiation to electrical energy that can be directed to the electrical grid of selected batteries for storage. Generally, such power stations provide energy at the utility level to the grid and not to a specific application.

In PV power stations, an arrangement of photovoltaic devices (photovoltaic panels) is typically positioned to be exposed to direct solar radiation. The exact position of the photovoltaic devices as typically determined based on path of the sun in the sky as seen from the specific location of the power station. Various arrangement techniques are used for optimizing collection of solar energy while considering changes in location of the sun throughout a day and changes in solar path throughout the year. Certain techniques use solar tracking requiring changes in orientation of the photovoltaic device on a daily basis in accordance with location of the sun. The use of fixed orientation, determined in accordance with yearly solar path, provides a reliable and low-cost technique and is used in various conventional PV power stations.

GENERAL DESCRIPTION

As indicated above, typical photovoltaic solar devices require direct exposure to solar radiation to provide conversion to electrical energy. Moreover, partial sun light, or partial shading of a solar panel area results in reduced efficiency in generating electricity within the solar module/panel. This is generally associated with partial exposure of the panel surface to light and may be associated with energy loss at the shaded regions. Accordingly, conventional photovoltaic (PV) power stations typically include a plurality of photovoltaic devices arranged to avoid shading for most positions of the sun in the sky.

More specifically, according to a typical design of PV power station (PV plant) the photovoltaic panels are mounted on respective frames forming photovoltaic arrays. These photovoltaic arrays are arranged in rows positioning the photovoltaic panels in accordance with the low paths of the sun (e.g., during local winter). Generally, each frame may hold one or more solar panels. The frames/racks are configured for holding the solar panels in selected tilt and azimuth angles, determined in accordance with sun path through the sky, neighboring potential shading obstacles (building, trees, mountains . . . ) and climate conditions (typical seasons or hours of particular cloudiness, typical hot and cold periods etc.). Alternatively, conventional PV plants may comprise selectively changeable tilt angle for tracking path of the sun in the sky throughout a day which may be continuously tracking or tilt adjustable in which the tilt is adjusted in a periodic manner typically every several weeks.

In either of these conventional configurations, the photovoltaic arrays are arranged in rows with respect to a general system axis, while a distance between the rows along the selected general system axis is selected to avoid shading of solar panels of one row by caused by PV arrays of a neighboring row (e.g., by the top edges thereof). Generally, conventional PV plants are typically set up with a general system axis directed about the south-north axis, while the PV panels are mounted facing generally toward the south in the north hemisphere (or north in the south hemisphere). More specifically, the rows of photovoltaic arrays are arranged along an axis generally aligned with east-west direction, where tilt of the photovoltaic arrays direct the photovoltaic panels thereof at an angle along the general system axis generally aligned with north-south direction. Alternatively, in some configurations, the PV plant is set up or with a general system axis directed about east-west axis wherein the PV panels are generally facing west or east. The latter configuration typically configured to allow more panels over a unit area while producing slightly less electricity per solar panel, per annum. In some cases, such configuration is used in combination with daily solar tracking, i.e., selective shift of tilt of the solar panels during a day to follow path of the sun.

The present invention provides a novel configuration of PV plant and of photovoltaic arrays for use in a PV plant. The present technique provides a photovoltaic system comprising a plurality of PV arrays associated with at least first and second groups of PV arrays arranged in an interleaved fashion within a selected region. The first groups of PV arrays are mounted with a selected fixed tilt angle. The fixed tilt angle is generally selected in accordance with geographical location of the PV system. In a typically arrangement where the generally system axis is generally aligned with north-south direction, the fixed tilt angle typically places the photovoltaic panels in non-horizontal orientation. The photovoltaic arrays of the second group, located between photovoltaic arrays of the first group and mounted with a selectively varying tilt angle. Tilt angle of the PV arrays of the second group may be selectively varied throughout a selected period (e.g., a year or a day) to obtain additional solar energy when the sun location or path if relatively high (e.g., summer, mid-day) and tilted to reduce shading in when the sun location or path is relatively low (e.g., winter, morning, evening). For example, the tilt of PV arrays of the second group may be shifted to a negative tilt angle during winter to reduce shading and shifted to a horizontal or positive tilt angle during summer to provide collection of additional solar energy. Alternatively, in some other configurations, the tilt of the PV arrays of the second groups is varied within a period of a day (e.g., in east-west configurations as described in more detail further below) and the PV arrays of the first group are located between them in a fixed tilt angle. Further, in some configurations, the PV arrays of the second group may be used for collecting some solar radiation during winter, while being positioned in negative angle to avoid shading of PV arrays of the first group. This is based on the distance D between rows of the PV arrays of the first group as described in more details below.

The present technique thus utilizes a combination of PV arrays mounted with fixed tilt angle and PV arrays mounted in selectively changeable tilt angle to avoid, or at least significantly reduce, shading of PV panels caused by relative location of other PV panels and the sun, and on the other hand optimize use of land area for solar harvesting during high sun season. Generally, the term land and land area as used herein refer to area used for the photovoltaic system. Such area may be actually on land, and may also be on roofs of buildings, or any other region when photovoltaic units may be used. The solar plant configuration of the present technique provides for improving land coverage ratio with respect to solar plant using fixed orientation photovoltaic arrays, while simplifying operation with respect to sun-following solar plants.

Additionally, the present technique provides a frame for mounting photovoltaic panels in a PV plant/system. The frame is configured for mounting a selected number of PV panels at a fixed tilt angle selected in accordance with location (e.g., latitude) where the frame is to be used; and for mounting one or more additional PV panels on a selectively tilting section of the frame, allowing selective tilt variation of the one or more additional PV panels.

Thus, according to a broad aspect, the present invention provides a photovoltaic system comprising a plurality of photovoltaic arrays; said plurality of photovoltaic arrays comprise first and second groups of photovoltaic arrays arranged in an interleaved fashion within a selected region; wherein photovoltaic arrays of said first group being mounted having a selected fixed tilt angle, and photovoltaic arrays of said second group are located between photovoltaic arrays of said first group and being mounted with a selectively varying tilt angle, thereby increasing land coverage ratio of said photovoltaic system.

According to a further broad aspect, the present invention provides a photovoltaic system comprising a plurality of photovoltaic arrays; said plurality of photovoltaic arrays comprise first and second groups of photovoltaic arrays arranged in an interleaved fashion of rows along a selected orientation axis within a selected region; wherein photovoltaic arrays of said first group are mounted with a selected fixed tilt angle directing photovoltaic panels of said first group of photovoltaic array toward an average solar path height and are positioned at selected distance D to avoid shading of the photovoltaic panels by photovoltaic panels of said first group in preceding row at times where solar path height is lower than the average solar path height; and wherein photovoltaic arrays of said second group are located between different rows of photovoltaic arrays of said first group and are mounted with a selectively varying tilt angle such that said photovoltaic arrays of said second group are tilted to align with shading lines at seasons where solar path is low to avoid shading of photovoltaic arrays of the first group, and tilted to face the sun during seasons of high solar path to increase collection of solar energy, thereby increasing land coverage ratio of said photovoltaic system.

According to some embodiments, the plurality of photovoltaic arrays may be arranged in rows along an row axis generally aligned to have the PV arrays positioned substantially at a north-south azimuth angle (generally within 30 degrees variation in accordance with geographical and topological location of the system), photovoltaic arrays of said first group being arranged with tilt angle and distance between them in accordance with latitude location, solar path and weather conditions associated with location of the photovoltaic field.

In some embodiments, the tilt angle of photovoltaic arrays of the second group may be adjustable within a selected time period in accordance with variation of shading regions formed by photovoltaic arrays of said first group within said selected time period.

According to some embodiments, the photovoltaic arrays of the first group may have length along the orientation axis associated with two or more solar panels, photovoltaic arrays of said second group having length along the orientation axis associated with two or less solar panels.

According to some embodiments, the photovoltaic arrays of the second group are mounted separately from photovoltaic arrays of said first group being located between photovoltaic arrays of said first group with respect to the orientation axis of the system.

The mounting arrangement of photovoltaic arrays of the second group may comprise at least one pivot located at a solar facing edge of said photovoltaic module. Alternatively, or additionally, the mounting arrangement of photovoltaic arrays of said second group may comprise at least one pivot located at central region of said photovoltaic module.

According to some embodiments, the photovoltaic arrays of said second group may be mounted with corresponding photovoltaic arrays of the first group on a common frame, said photovoltaic arrays of said second group may be mounted on a pivot on solar opposing edge of corresponding photovoltaic arrays of the first group. Generally, when the PV arrays of the first and second group are mounted using a common or partially common frame, three rotating or sliding connections may be needed, i.e., three pivots, two pivot and one sliding connection etc.

Generally, the selected fixed tilt angle of photovoltaic arrays of the first group is non-horizontal. For example, the selected fixed tilt angle may be selected in accordance with latitude location of the photovoltaic system in accordance with table 1 below, e.g., allowing ±10 degrees variation in the selected fixed tilt angle.

According to some embodiments, the plurality of photovoltaic arrays may be arranged in rows along an orientation axis generally aligned substantially with east-west orientation (generally within 30 degrees variation in accordance with geographical and topological location of the system), photovoltaic arrays of said first group being arranged with a substantially horizontal tilt angle (typically with a slight ±5 degrees tilt), photovoltaic arrays of the second group are mounted with selectively varying tilt angle varying throughout a day in accordance with solar path.

The photovoltaic arrays of said second group may have length along the orientation axis associated with two or more solar panels, photovoltaic arrays of said first group having length along the orientation axis associated with two or less solar panels.

According to some embodiments, the photovoltaic arrays of said second group may be mounted on telescopic support structure and configured to selectively vary height of solar panels mounted thereon.

According to one other broad aspect, the present invention provides a frame for mounting a photovoltaic module, the frame comprising a first fixed tilt construction adapted for mounting of one or more solar panels in a selected fixed tilt angle, and a second adjustable tilt construction adapted for mounting of one or more solar panels with a selectively adjustable tilt angle.

According to some embodiments, the selected fixed tilt angle is non-horizontal. For example, the selected fixed tilt angle may be selected in accordance with latitude location of the photovoltaic system in accordance with table 1 below, e.g., allowing ±10 degrees variation in the selected fixed tilt angle.

According to some embodiments, the second adjustable tilt construction may be configured to selectively enable position of the second adjustable tilt construction at negative tilt angle to avoid shading of preceding photovoltaic modules and at selected positive tilt angle to increase collection of solar radiation.

According to some embodiments, the second adjustable tilt construction may be rotatable with a selected rotation range about a pivot axle, said pivot axle is located adjacent to top end of said first fixed tilt construction.

The frame may comprise a common beam supporting the first fixed tilt construction, and a secondary support beam extending from said common beam for supporting said second adjustable tilt construction. Generally, when the first fixed tilt construction and second adjustable tilt construction are connected using a common or partially common frame, three rotating or sliding connections may be needed, i.e., three pivots, two pivot and one sliding connection etc.

The secondary support beam may be a telescopic support beam having selectively adjustable length.

The second adjustable tilt construction may be mounted on a secondary ground connection.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4A shows the PV array and FIG. 4B exemplifies a frame for mounting PV panels;

FIG. 5A shows the PV array and FIG. 5B exemplifies a frame for mounting PV panels;

DETAILED DESCRIPTION

According to the technique of the invention a photovoltaic system is provided, the photovoltaic system is formed by a plurality of photovoltaic arrays. The plurality of photovoltaic arrays includes at least first and second groups of photovoltaic arrays arranged in an interleaved fashion within a selected region (the area of the PV plant). The photovoltaic arrays of the first group are mounted to hold photovoltaic panels thereof with a selected fixed tilt angle. Photovoltaic arrays of the second group are located between photovoltaic arrays of the first group and are configured to mount photovoltaic panels to provide a selectively varying tilt angle. The present technique thus allows increase in ground coverage ratio of the photovoltaic system. The present technique may also enhance energy/electricity production the different PV panels in a PV system as compared to convention PV system arrangements.

Figure 1:
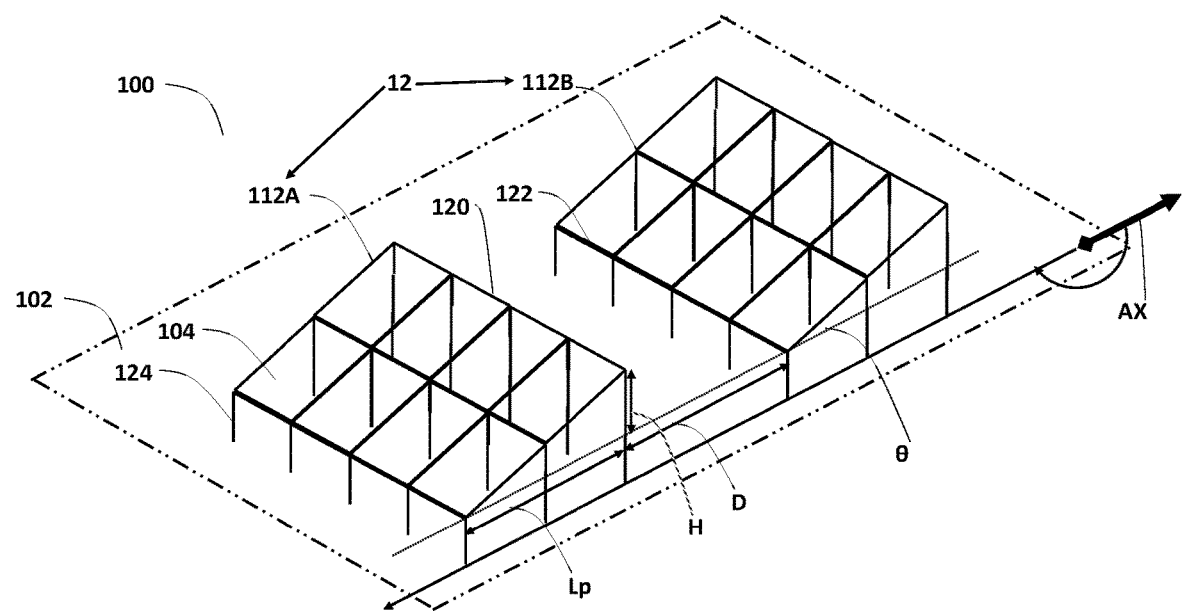
FIG. 1 illustrates an arrangement of photovoltaic system including two photovoltaic arrays according to the conventional technique.

Reference is made to FIG. 1 providing a schematic illustration of a conventional PV plant 100 located in a selected field 102. The PV plant exemplified in FIG. 1 is formed by a consecutive arrangement of photovoltaic arrays 12 (exemplified by arrays 112A and 112B). Each array 12 is formed by an arrangement of one or more PV modules/panels mounted on a respective frame 124 and generally connected with selected electrical connections for collecting harvested energy (not specifically shown here). The PV arrays 12 are positioned along a general system axis AX defining direction of the PV plant. The frame 124 of each array is configured for mounting of the PV panels at a selected fixed tilt angle (θ).

In this exemplary illustration arrays 112A and 112B are similar and each carries a selected number of PV panels 104 arranged in a selected two-dimensional array. For example, in FIG. 1 eight PV panels are arranged in 2-by-4 arrangement in each array 112A and 112B, however the panels 104 may be arranged in various arrangements. Generally, for simplicity, each array can be considered as a one-dimensional array along the general system axis, while the length of the array perpendicular to the general system axis may be replicated to occupy the width area designated of the PV system or parts thereof. Thus, the PV arrays exemplified in FIG. 1 are of two PV panels in length along the general system axis, and of a general width.

As indicated above, the PV arrays 112A and 112B are adapted for mounting the PV panels 104 at a selected tilt angle to allow efficient collection of solar energy based on path of the sun in the sky. More specifically, the tilt angle θ is typically selected in accordance with path of the sun (e.g., during local summer), positioning the PV panels 104 facing the sun during winter days. This configuration results in far end 120 of the PV array 112A to be located higher with respect to the solar facing end 122 of the array, this height difference is marked H. Due to the height difference H, the top end 120 of array 112A may cause shading of regions of the field 102 that may stretch to part of PV array 112B.

For example, a recommended tilt angle with respect to zenith for different latitude locations may be given by the following table 1. The recommended tilt angles are selected to provide optimal energy collection throughout a year. More specifically, this recommended tilt angle provides certain balance between summer and winter seasons and the solar path in those seasons. As shown, in high latitude regions, the tilt angle may be relatively large. This may result in long shades projected by the PV arrays, typically during winter and the solar path is low. Actual recommended tilt angles may vary from table 1 by a range of 5-10 degrees in each direction.

To this end, the PV arrays 12 are typically located at a distance D between them along the general system axis AX. The distance D is selected to avoid shading of PV panels 104 of one array (e.g., 112B) by top region of preceding array 112A. This enables undisrupted energy collection throughout a year, as the high sun during the local summer provides abundance of solar radiation, while the PV arrays are mounted for optimizing collection of solar radiation during local winter. Thus, a distance D between row of PV arrays may be increased to avoid energy loss, at the cost of land coverage ratio. Typically, the distance D between rows of PV arrays may be determined based on height difference H and minimal angular location of the sun.

TABLE 1

| Latitude | Tilt angle with respect to zenith |
|---|---|
| 0° | 0° |
| 5° | 4.4° |
| 10° | 8.7° |
| 15° | 13.1° |
| 20° | 17.4° |
| 25° | 22.1° |
| 30° | 25.9° |
| 35° | 29.7° |
| 40° | 33.5° |
| 45° | 37.3° |
| 50° | 41.1° |

Distancing the PV arrays 12 between them limits the land coverage ratio of PV system 100. More specifically, given the horizontal projection of the array on the ground marked as Lp. A ratio between the land to solar harvesting for given system width can be determined by Lp/(Lp+D). This arrangement limits land area to solar energy ratio as a large portion of the field 102 is not used for collection of solar energy even when the solar path does not cast shade on the region (e.g., during local summer spring and fall).

Figure 2:
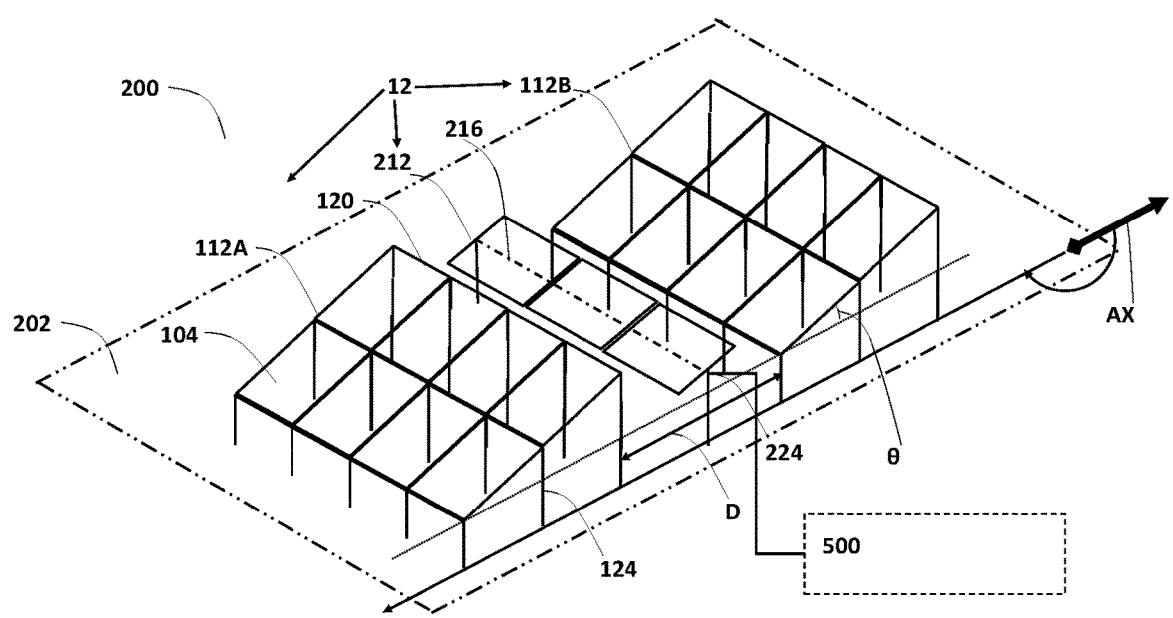
FIG. 2 illustrates an arrangement of photovoltaic arrays in a photovoltaic system according to some embodiments of the present invention.

Reference is made to FIG. 2 exemplifying a PV system 200 according to some embodiments of the present technique. PV system 200 is formed by an arrangement of photovoltaic arrays 12 in a selected region 202, where the PV arrays 12 are positioned and configured for collecting solar radiation and converting the collected radiation to electrical energy. The PV arrays 12 or system 200 include PV arrays of a first group (112A and 112B) and PV arrays of a second (212) groups, positioned between PV arrays of the first group. The PV arrays of the first group 112A and 112B each include a frame 124 mounting PV panels 104 with selected fixed tilt angle θ, selected in accordance with location of the PV system 200 (e.g., latitude and local conditions). Further, the distance D between PV arrays 112A and 112B is generally selected to eliminate, or at lease significantly reduce shading of PV panel 104 of one PV array 112B by far end 120 of the preceding PV array 112A. PV arrays of the second group 212 are located in the region between the PV arrays of the first group 112A and 112B. The PV arrays 212 of the second group include, or are mounted on, a frame 224 configured with at least one tilt varying axis 216. the frame 224 is configured for carrying a selected arrangement of PV panels 104. The frame 224 of PV array 212 is selectively rotatable about axis 216 to selectively varying tilt angle of the PV panel with respect to the ground or to zenith. It should be noted and as indicated above, that the selected region may be on the ground, top of other structures, such as roof, or any other region when photovoltaic system may be used.

Generally, as exemplified in FIG. 2 the PV arrays 212 may be connected to a control unit 500 enabling selective adjustments of the tilt angle of PV arrays 212. The control unit 500 may include mechanical and/or electronic control allowing automatic or manual tilt angle adjustments as described in more detail further below.

Photovoltaic array 212 is positioned at a selected location between PV arrays of the first groups 112A and 112B, to provide increased land coverage ratio of PV system 200 by providing additional photovoltaic panels within same land area. The PV array 212 is configured to be selectively tilted for improved collection of solar radiation at times when the sun path is relatively high (e.g., local summer), and may be tilted to align with solar rays and avoid increased shading at time when the solar path is relatively low (e.g., local winter). For example, the PV array 212 may be tilted to tilt angle selected for collecting solar radiation during summer, and tilted to a negative (i.e., away from the sun) tilt angle to avoid shading in the winter. The summer tilt angle is typically selected in accordance with location of the PV plant. For example, in latitude between 25 and 50 degrees, the summer tilt angle may be selected to be selected by tilt angle=0.93X latitude=21 degrees. This is while the tilt angle during the winter may be selected to align with shading lines and avoid casting shade e.g., as exemplified in FIG. 3C below.

Figure 3A:
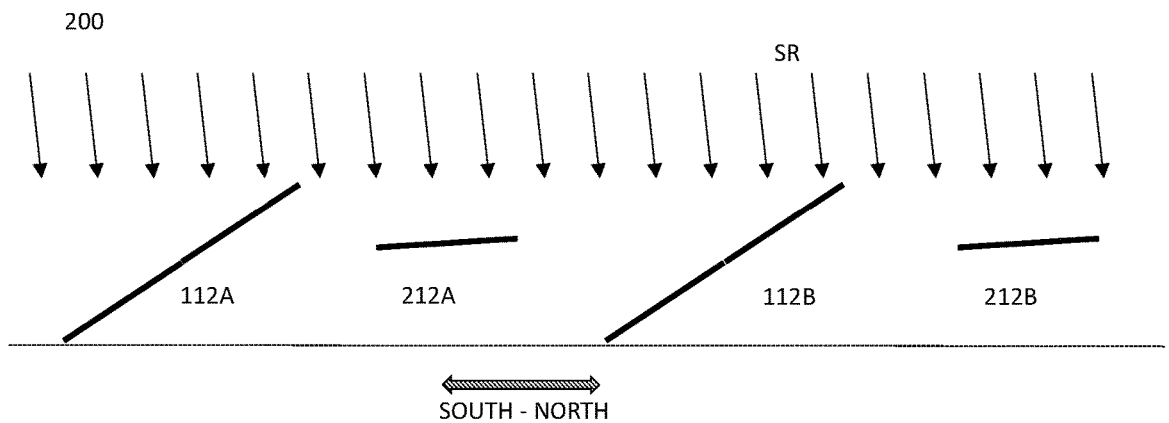
FIGS. 3A to 3C illustrate photovoltaic system configured with array frame for mounting selected photovoltaic panels with varying tilt angle according to some embodiments of the present invention.
Figure 3B:
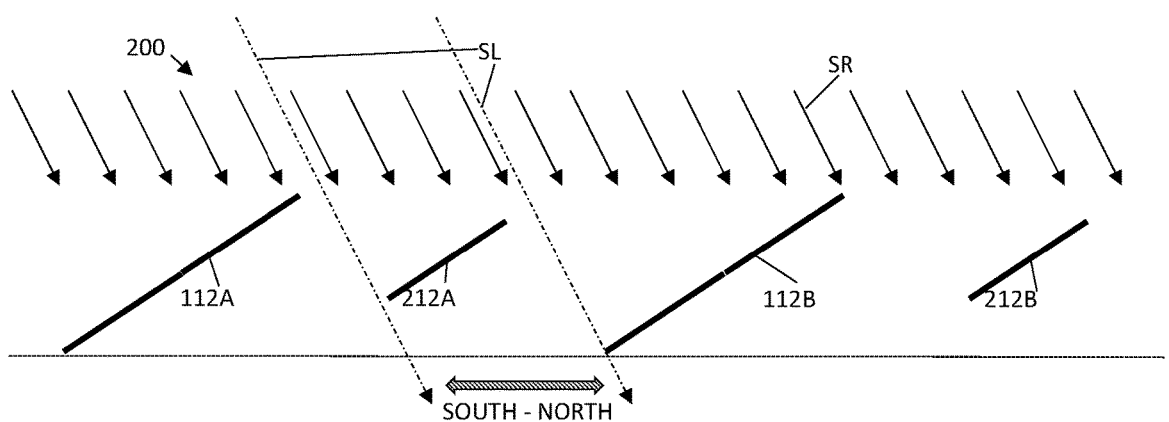
Figure 3C:
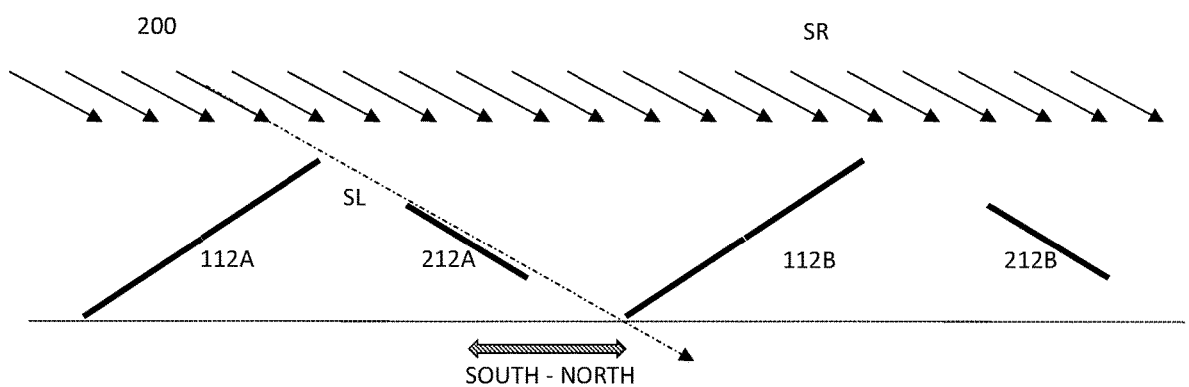

In this connection FIGS. 3A to 3C exemplify variation in tilt angle of PV arrays 212 of the second group. In this example the general system axis is shown relating to north-south axis, and the solar path is exemplified for northern hemisphere. It should be notes that similar concept applies in the southern hemisphere in accordance with variation in solar path. FIGS. 3A to 3C schematically exemplify side view of PV system 200 according to some embodiments of the invention. The system is exemplified by PV arrays 112A and 112B of the first groups and PV arrays 212A and 212B of the second group. In FIG. 3A, the relative sun path is relatively high providing solar radiation SR impinging at almost perpendicular angle with respect to the ground. More specifically, the solar radiation SR impinges at angle of 60-90 degrees with respect to horizontal axis, or 0-30 degrees with respect to zenith. At this solar position, the PV arrays 212A and 212B do not cause shading and may operate at high efficiency for collection of solar radiation SR. In FIG. 3B, the relative solar path is lower, and may be relating to angle of 36-66 degrees with respect to horizontal line, or 24-54 degrees with respect to zenith. At this solar position, the PV arrays 212A and 212B are tilted to face the direction of solar radiation SR to thereby optimize collection of solar radiation (e.g., during fall and spring seasons). As shown by shading line SL, location, and tilt angle of PV arrays 212A and 212B is selected to avoid shading between respective PV arrays of the system. In FIG. 3C, the relative solar path is even lower, and may be relating for example to angle of 13-43 degrees with respect to the horizontal line, or 47-77 degrees with respect to zenith, e.g., at around noon. At this time, the PV arrays 212A and 212B may be tilted to a negative tilt angle to align with shading line SL and avoid any shading of further PV arrays of the first group (e.g., PV array 112B). When aligned to avoid shading, PV arrays 212A and 212B may still collect some energy due to ambient light exposure or be inoperable depending on type and efficiency of the solar panels used. Generally, PV arrays 212A and 212B may be connected to a separate electric circuitry for collection of solar generated electricity to avoid energy lose when positioned at tilt angle that causes PV arrays 212A and 212B to face away from the sun.

Further, it may be worth noting that in some selected tilt angles of PV arrays of the second group, PV arrays 212A and 212B may be positioned for greater efficiency in collection of solar radiation. For example, in during summer (local summer) morning and evening, the solar path may be slightly north (or south in the southern hemisphere), resulting in improved collection of solar radiation by PV arrays 212A and 212B as compared to PV arrays 112A and 112B as can be seen in FIG. 3A.

This configuration of PV system 200 enables increase in land coverage ratio during seasons when the solar path insufficiently high, while avoiding loss associated with shading in time when the solar path is lower. This may provide 10-60% improvement in land coverage ratio of the PV system 200.

It should be noted that orientation of the general system axis, and accurate tilt angles are typically determined in accordance with exact location of the PV system 200. Generally, the general system axis is along the north-south axis, or shifted by up to 30 degrees therefrom, in accordance with solar path, geographical conditions and/or anticipated weather conditions associated with the location of the system. Further, the selection of tilt angle of the PV arrays 112A and 112B may be determined based on height of the solar path during midday hours of the relevant season, or during morning and evening hours.

Further, as indicated above, the PV arrays of the first and/or second group may each mount a selected arrangement of PV panels. As exemplified herein above, the PV arrays of the first group may be configured for mounting an array of two PV panels along the general system axis, FIGS. 1 and 2 exemplify an arrangement of two-by-four, other examples may include two-by-eight or generally a two-by-n arrangement. Additional configurations may include a three-by-n arrangement of the PV arrays of the first group, or four-by-n or more. Generally, the longer each PV array (along the general system axis AX) the higher is the far end 120 of the array, which may result in the need to enlarge the distance D between arrays.

Accordingly, the PV arrays of the second group may mount an arrangement of one-by-n PV panels, or two-by-n. The selection of the arrangement may be determined based on the distance D between PV arrays of the first group, as well as based on lower path the of the sun and optimization of energy collection throughout the year. Generally, the PV arrays of the PV system may vary between them in number of PV panels on each array, or the sizes of panels. The PV panels may be positioned within each array in landscape orientation where the short dimension of the PV panel is parallel to the general system axis or in portrait orientation where the long dimension of the PV panels is parallel to the general system axis. Typical dimensions of PV panels are generally determined by the industry. Typical available dimensions include the following dimensions: 64.57'× 39.29', 77.17'×39.29', 65'×40', 80'×40', 61.34'×31.42×, 61.34'×41.18' and 83'×39.68', and various other dimensions. It should be noted that the actual size and mounting orientation of the PV panels may vary length dimensions such as distance D and projection length Lp indicated above. However, the shading of PV arrays is typically a result of solar angular location and selection of tilt angles for reducing shading may be done irrespective of physical size of the PV panels used.

Figure 4A:
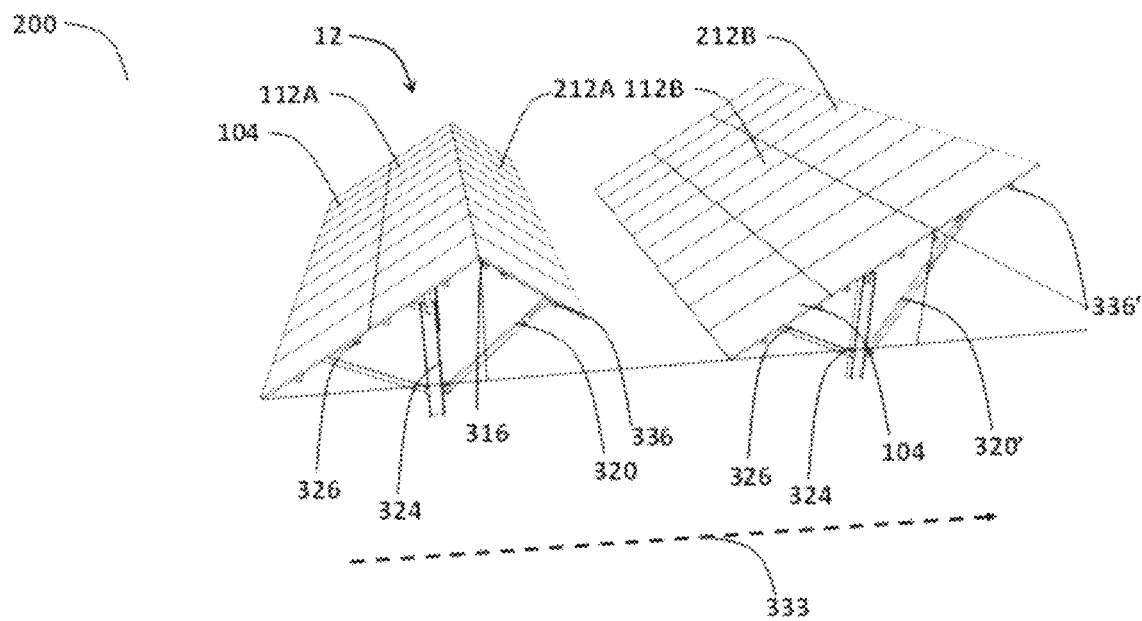
FIGS. 4A and 4B illustrate an additional example of array frame mounting selected PV panels with selectively adjustable tilt angle according to some embodiments of the invention.
Figure 4B:
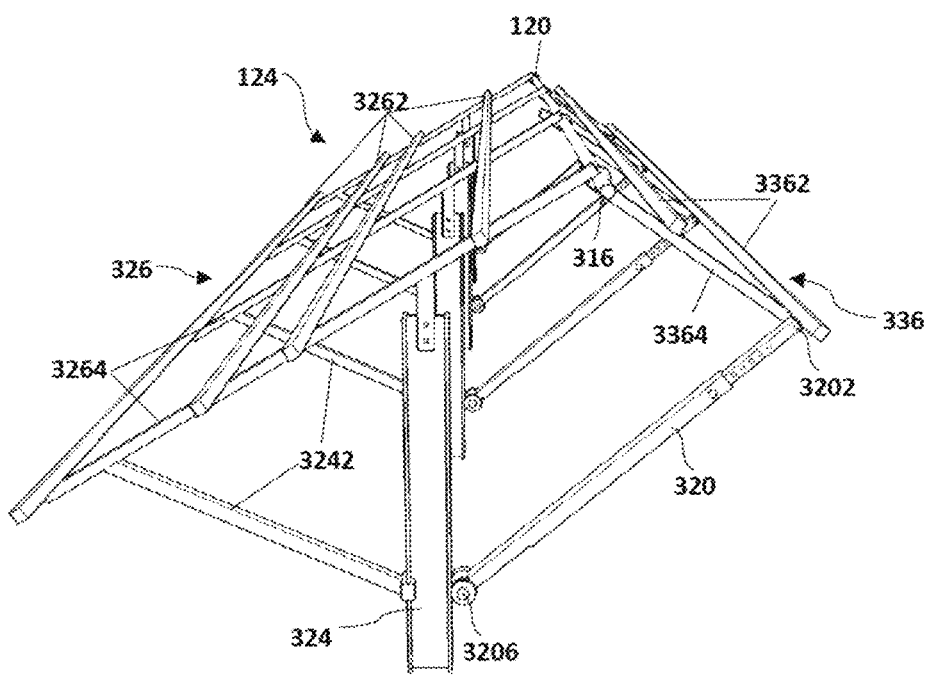

Generally, as indicated above PV arrays 212 of the second group may be positioned as separate PV arrays location at a selected position between PV arrays of the first group (112A and 112B). Additionally, or alternatively, PV arrays of the second group may be mounted as additional sub-frame mount on PV arrays of the first group. In this connection, reference is made to FIGS. 4A and 4B illustrating respectively PV arrays 12 configuration and frame configuration. In FIG. 4A the PV arrays of the second group exemplified by 212A and 212B are mounted on a common frame 324 with PV arrays 112A and 112B of the first group. The PV arrays are arranged in rows along a general orientation axis 333, typically being around north-south direction. More specifically, the system 200 is formed by an arrangement of a plurality of PV arrays 12, the PV arrays 12 are formed by a frame having first portion 326 (also referred herein as first fixed tilt construction) configured for mounting a first array of PV panels 112A or 112B at a fixed tilt angle, and a second frame portion 336 (also referred herein as second adjustable tilt construction) configured for mounting a second array of PV panels 212A or 212B at selectively changeable tilt angle. In FIG. 4, PV array 212A exemplifies tilt position selected to prevent shading as described with reference to FIG. 3C and PV array 212B is positioned in tilt angle selected for efficient solar harvesting.

As shown, frame 324 is configured to be fixed on the ground, or any other platform of employment of the PV array 12. The first frame portion 326 (first fixed tilt construction) is directly attached to the mount and configured for supporting a first array of selected number (e.g., two-by-n) PV panels 104. The second frame portion 336 (second adjustable tilt construction) is connected to the first portion 326 via a pivot axis 316. The tilt angle of the second frame portion 336 (second adjustable tilt construction) about the pivot 316 can be determined by adjusting length of support beam 320. As shown in FIG. 4A, second array 212A is adjusted to be at a negative tilt angle, typically used to avoid shading when the solar path is low, and second array 212B is adjusted at a tilt angle similar to the fixed tilt angle of the first PV arrays 112A and 112B. This adjustment is selected in this example by selection of length of support beam 320 and support beam 320'. Generally, support beam 320 (and 320') may be connected to the common frame 324 via a first pivot connection, the to the second frame portion 336 via a second pivot connection to allow proper variation in tilt angle of second frame portion 336. Support beam 320 may be telescopic with selected number of mounting positions or having smooth shifting allowing fine tuning of the tilt angle of PV array 212A or 212B. As indicated above, with reference to FIGS. 3A to 3B, selection of the tilt angle of the second portion 336 of the frame, affecting tilt angle of second PV array 212A as illustrated in FIG. 4A, is determined in accordance with solar path to avoid shading of further PV arrays (e.g., PV array 112B) by the far end 120 of preceding PV array (e.g., array 212A). This is while, at the times that PV array 212A is exposed to solar radiation, it is used for harvesting the radiation for generating electrical energy, and when PV array 212A is positioned at negative angle as in FIG. 4A, and is not exposed to solar radiation, the PV panels thereof may operate at lower efficiency or, at times, may be electrically disconnected to avoid energy loss.

FIG. 4B exemplifies a frame 124 configured for mounting PV panels to form PV array as exemplified in FIG. 4A. As indicated above, the frame 124 is formed with a first frame portion 326 (first fixed tilt construction) providing platform for positioning of PV panels associated with PV array of the first group, and second frame portion 336. The common frame 324 provides ground support, and support beams 3242 and 320 extend from the common frame to support the first 326 and second 336 frame regions, respectively. Support beam 320 may be connected to common frame 324 by a pivot connection point 3206 enabling certain rotation of beam 320 when tile angle of the second frame portion 336 is changed. The first frame portion is supported by common frame 324 and support beams 3242 and includes a plurality of vertical 3264 and horizontal 3262 support beams providing surface for mounting of a selected arrangement of PV panels on the first frame portion. Generally, the first frame portion 326 may extend its far end 120 to be aligned with pivot axle 316 supporting the second frame portion. The second frame portion 336 is supported by support beam 320, e.g., via pivot axle 3202, and main pivot axle 316. Support beam 320 is generally configured to be telescopic beam, allowing manual or mechanical changes to length of the beam 320 (in selected steps of continuous length changes). Similarly to the first frame portion, the second frame portion 336 includes vertical 3364 and horizontal 3362 support beams positioned for supporting a selected arrangement of PV panels, while allowing changeable tilt angle of the entire second frame portion including the respective PV panels as described herein.

Figure 5A:
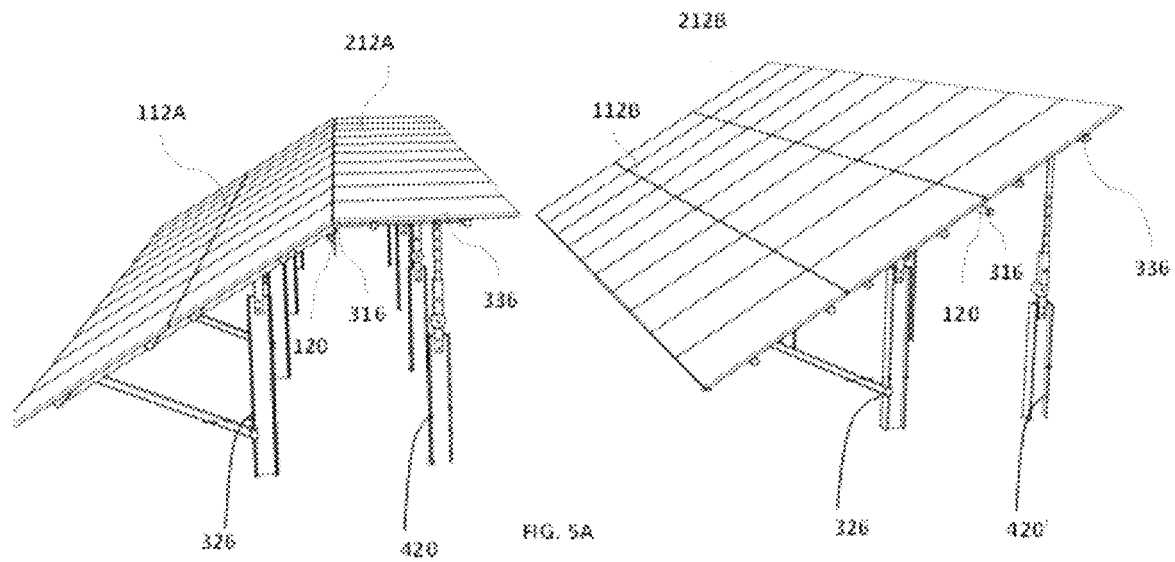
FIGS. 5A and 5B illustrate a further additional example of array frame mounting selected PV panels with selectively adjustable tilt angle according to some embodiments of the invention
Figure 5B:
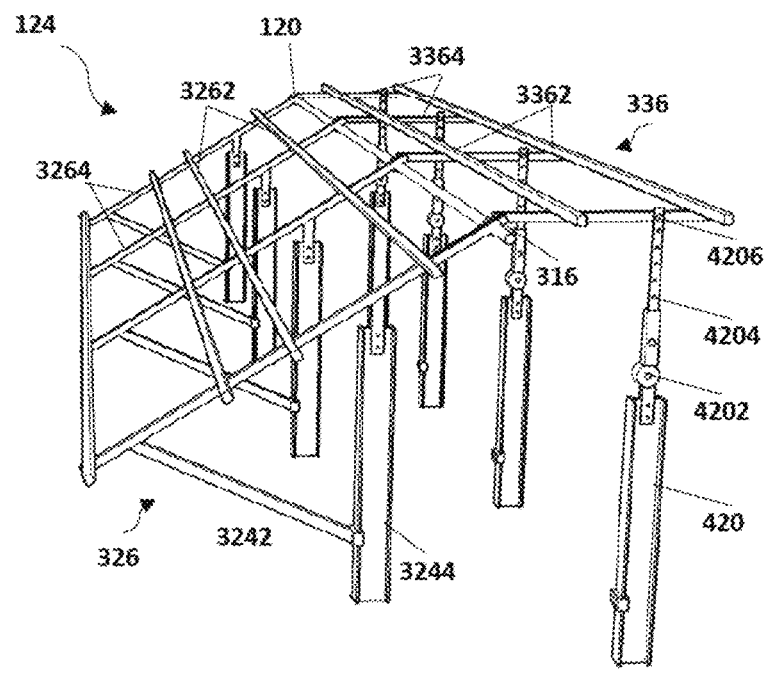

An additional mounting configuration is exemplified in FIGS. 5A and 5B. Similarly, to FIGS. 4A and 4B, FIGS. 5A and 5B illustrate PV arrays 112A, 212A, 112B and 212B (FIG. 5A) and frame 124 for mounting such PV arrays (FIG. 5B). In the example of FIG. 5A the second PV arrays 212A and 212B are mounted on frames positioned directly on the ground via ground connections 420 and 420' respectively. However, the leading edge of the respective second frame portion 336 is connected at pivot axis 316 to the far end 120 of the first portion of the frame 326. In this configuration, variation in length of ground connections 420 or 420' allows varying tilt angle of the second frame portion 336, thereby adjusting tilt angle of the second PV array 212A or 212B, as exemplified by the consecutive PV array 212B. In some configuration, the attachment points of the ground connection 420 or 420' with the second PV array 212A may be sliding connectors allowing smooth variations of tilt angle.

Additionally, FIG. 5B illustrates a frame 124 configured for mounting PV arrays as exemplified in FIG. 5A. The frame includes first frame portion 326 positioned on the ground via main beam 3244, and second frame portion positioned on the ground via ground connection 420. A support beam 3242 is extending from main beam 3244 for supporting bottom end of the first frame portion 326. The first portion 326 extends between bottom end supported by beam 3242 and top end 120 (e.g., located close to pivot axle 316) supported by main beam 3244. The first frame portion includes a plurality of vertical 3264 and horizontal 3262 support beams providing surface for mounting of a selected arrangement of PV panels on the first frame portion 326. The second frame portion 336 is supported by ground connection 420, generally configured as telescopic ground connection, and main pivot axle 316. The ground connection 420 may generally allow manual or mechanical changes to length of the ground connection 420 (in selected steps of continuous length changes). More specifically, ground connection 420 may include a pivot axle 4202 located at a middle section thereof. Above the pivot axle 4202, section 4204 of the ground connection 420 may be the telescopic section, connected to vertical line 3364 of the second frame portion 336 via a connection pivot axle 4206. This configuration enables changes in tilt angle of the second frame portion 336 by changing length of section 4204 of the ground connection 420. Alternatively, ground connection 420 may be fixed as strait beam including telescopic section 4204, this is while pivot connection 4206 may also be configured to slide along vertical beam 3364. Similarly to the first frame portion (first fixed tilt construction), the second frame portion 336 includes vertical 3364 and horizontal 3362 support beams positioned for supporting a selected arrangement of PV panels, while allowing changeable tilt angle of the entire second frame portion including the respective PV panels as described herein.

The configuration of FIGS. 5A and 5B enable connecting PV arrays of the second group 212A and 212B into an existing PV system, in additional to PV arrays with fixed tilt angle that may already be mounted in the field. To this end the additional PV arrays 212A and 212B (PV arrays of the second group) are added while being connected with a hinge, or axle, to the PV arrays of the first group, and a ground connection 420 and 420'.

Figure 6A:
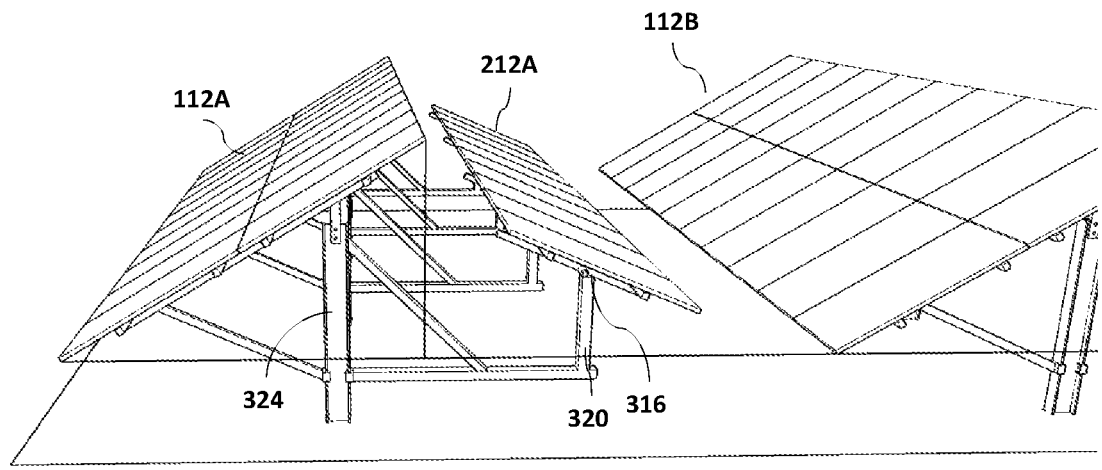
FIGS. 6A to 6C exemplify and additional configuration of a PV system where PV arrays of the second group are mounted on a partially common frame, FIG. 6A exemplifies negative tilt angle and FIG. 6B exemplifies horizontal tilt angle, FIG. 6C exemplifies a frame for mounting PV panels according to some embodiments of the present invention.
Figure 6B:
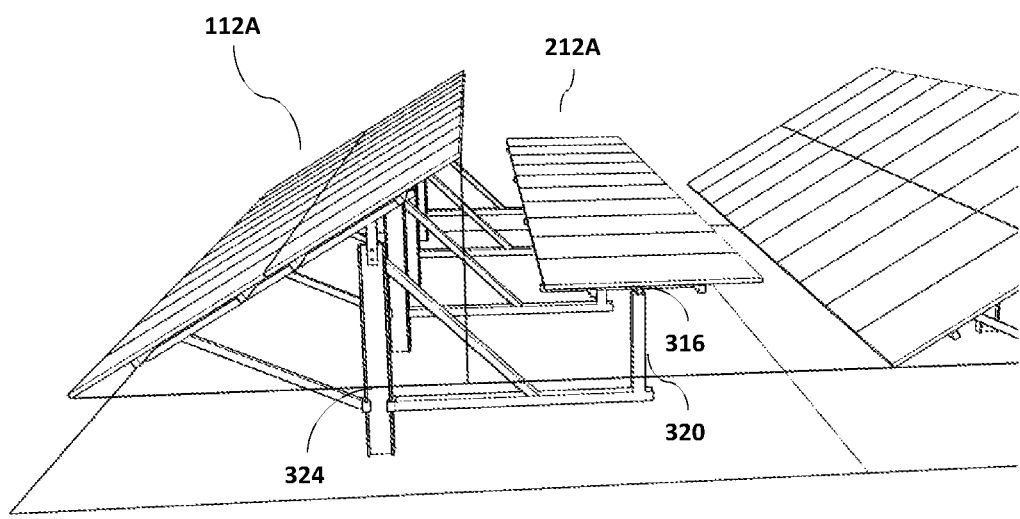
Figure 6C:
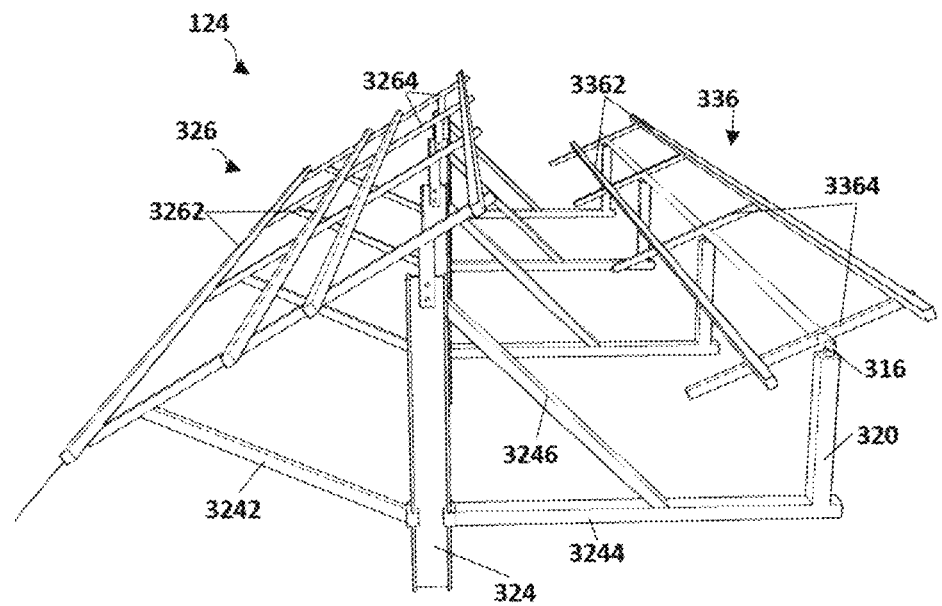

Additional mounting configuration is exemplified in FIGS. 6A to 6C, in this configuration, the PV array 212A of the second group is mounted a connection support beam 320 extending from frame 324 supporting the PV array 112A of the first group. FIG. 6A exemplifies PV array 212A positioned in a negative tilt angle, generally suitable for winter (e.g., low solar path), and configured to avoid shading of PV array 112B. FIG. 6B exemplifies the PV array 212A in neutral tilt angle, such that the PV array 212A and the corresponding PV panels 104 are positioned horizontally. FIG. 6C exemplifies a frame 124 configured for mounting selected arrangement of PV panels to provide the PV array structure of FIGS. 6A and 6B. This tilt angle is generally suitable for summer when the solar path is relatively high. As indicated above, when the sun is relatively high, shading is not an issue, while efficient use of the land area of the PV system 200 may be optimized for energy collection. The PV array 212A is generally mounted on connection support beam 320 via pivot mount 316 allowing variation of tilt angle.

Generally, in FIG. 6B the PV array 212A of the second group is illustrated at a lower height with respect to PV array 112A of the first group. Generally, the height of the PV arrays of the second group may be determined in accordance with paths of the sun with respect to location where the PV system is employed. Further, it should be noted that support beam 320 may also include a telescopic element adapted to selectively vary length of the support beam 320. This configuration enables variation in height of the PV array 212A. More specifically, PV array 212A may be move to a higher position for time when the solar path is high or intermediate, and moved to a lower position at times when the path of the sun is low to avoid shading.

The frame 124 is illustrated in FIG. 6C. In this example, the first and second frame portions 326 and 336 are mounted on common frame beam 324. Support beams 3242 and 3244 extend from common frame beam 324, where beam 3242 supports bottom end of the first frame portion 326 and beam 3244 supports beam 320 that carries the second frame portion 336. An additional support beam 3246 may be used to strength. The second frame portion 336 is mounted directly on pivot axle 316, located at end of support beam 320. In some configurations, support beam 320 may also be telescopic, allowing change of height of the second frame portion 336. The first and second frame portions provide platform for mounting selected arrangement of PV panels as described above, e.g., using vertical and horizontal beams such as 3262, 3264, 3362 and 3364.

Figure 7:
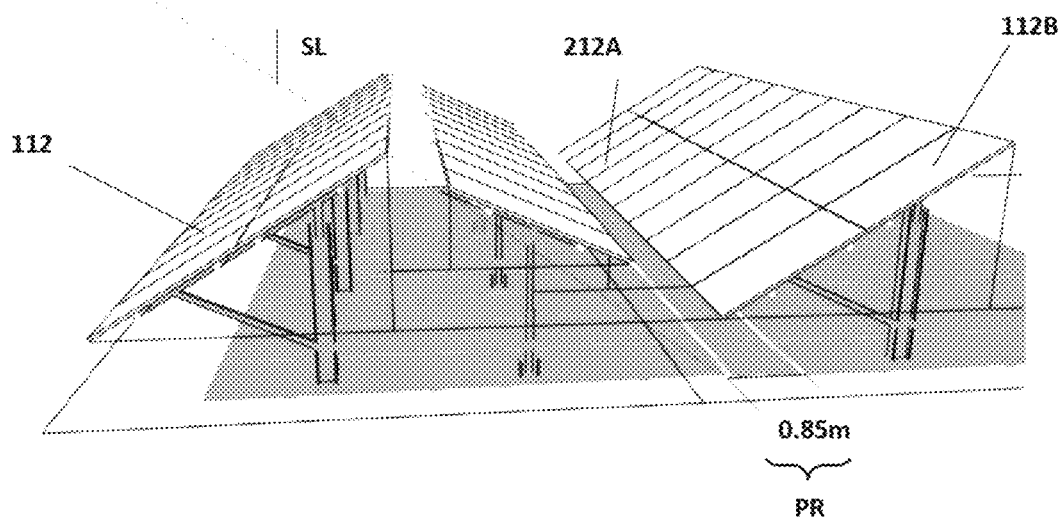
FIG. 7 exemplifies a photovoltaic system according to some embodiments of the present invention, utilizing a configuration where the PV arrays of the second group are tilted to avoid shading during winter while still enable collection of some solar radiation.

Reference is made to FIG. 7 exemplifying a photovoltaic system configuration according to some embodiments of the invention. In this example, the PV arrays of the second group 212A are positioned between rows of PV arrays of the first group 112A and 112B as indicated above, while being tilted to a negative tilt angle during winter to avoid shading. As exemplified in FIG. 7, the PV arrays of the second group 212A are shown to be tilted to an angle that does not align with shading line SL, associated with line of shade of top end of PV array 112A, but is positioned to collect some solar radiation. This is exemplified by projection shade PR. In this configuration, the PV arrays of the second group 212A are positioned at a positive tilt angle as exemplified above during summer to allow efficient collection of solar radiation, while being positioned at a negative tile angle during the summer to avoid shading, while still enable collection of solar radiation. It is clear the PV array 212A collection is greatly reduced as evident from the length of the projection shade thereof. However, the use of such second group of PV array enables improved land coverage ratio during most of the year, while maintaining simplified photovoltaic system and avoid energy loss due to shading.

Figure 8:
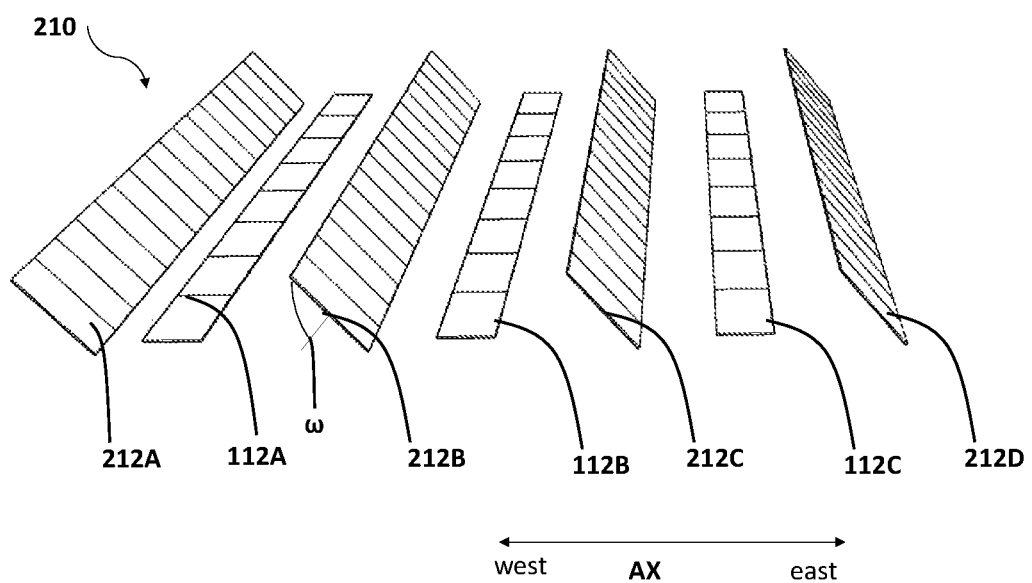
FIG. 8 illustrates a PV system according to some embodiments of the present technique configured for daily solar tracking.

As indicated above, the present technique may also be used for improving land coverage ratio in PV systems utilizing daily solar tracking. This is exemplified in FIG. 8 illustrating a PV system 210 including an arrangement of PV arrays along a general system axis AX extending east-west (or with certain range about the east-west direction). More specifically, The PV system 210 in this example includes a plurality of PV arrays of the second group, e.g., PV arrays 212A, 212B, 212C, and 212D arranged in a row along a general system axis AX extending substantially along east-west axis. The PV arrays of the second group 212A-212D are configures to vary tilt angle ω thereof for tracking solar path in the sky through a day. For example, the PV arrays 212A-212C are configured to shift tilt angle from 60° with respect to zenith to the east in the morning hours, to zenith at midday and to 60° to the west (with respect to zenith) at evening. The PV arrays 212A-212C are positioned with distance D between them, selected to avoid shading of west end of one PV array (e.g., 212A) on preceding PV array (e.g., 212B) in morning hours starting a time when the sun reaches a selected angle (e.g., 20°-30°) and to the opposite direction at evening, i.e., when the sun reached angle of 20°-30° to the west.

As also illustrated in FIG. 8, according to the present technique, an additional arrangement of PV arrays of a first group 112A-112C is used positioned in the distance D between the PV arrays 212A-212C of the second group. The additional PV arrays 112A-112C are positioned with a fixed tilt angle, being substantially horizontal (i.e., facing zenith). Generally, the PV arrays of the first group 112A-112C utilizes separated electrical connection, this is to avoid energy loss at the times when the PV arrays 112A-112B of the first group are under shading conditions by PV arrays of the second group 212A-212D, and typically during morning and evening hours. Thus, the present technique enables increase in land coverage ratio and increase harvesting of solar energy at times when the sun in relatively high, while avoids additional shading at times when the sun is relatively low. Generally, in this configuration, the PV arrays of the first group 112A-112C may include an arrangement of one-by-n or two-by-n solar panels, while the PV arrays of the second groups 212A-212D may be larger and include arrangements of two-by-n, three-by-n, or four-by-n PV panels.

Thus, technique of the present invention provides for improved use of land area designated for photovoltaic power systems. The present technique is directed at using regions that are generally limited due to shading, by combining arrangement of first and second groups of PV arrays where the first group PV of PV arrays are mounted with fixed tilt angle and the second group of PV arrays includes PV arrays mounted to allow variation in tilt angle. It should be noted that the above decryption of the present technique relates generally to land area that is substantially flat. Employing PV power system along a hillside region, or when the land area has certain slope may include additional adjustments. For example, a employing a PV solar plan along a south-facing slope may allow positioning the PV panels in a single plane with limited to no issue of shading, this is while a north-facing slope may be found unsuitable for use for PV power plant. Generally, the technique of the present invention is described herein with respect to a selected horizontal flat plane, while the actual surface may be curved or include certain slope to one or more dictions.

The invention claimed is:

1. A photovoltaic system, comprising:
   a plurality of photovoltaic arrays;
   said plurality of photovoltaic arrays comprise first and second groups of photovoltaic arrays arranged in an interleaved fashion of rows along an orientation axis generally aligned at north-south azimuth within a selected region;
   photovoltaic arrays of said first group are mounted with a selected fixed tilt angle directing photovoltaic panels of said first group of photovoltaic arrays facing generally toward the equator and are positioned at selected distance D to avoid shading of the photovoltaic panels by top end of preceding photovoltaic panels of the first group; and
   wherein photovoltaic arrays of said second group are located between photovoltaic arrays of said first group and are mounted with a selectively varying tilt angle such that said photovoltaic arrays of said second group are tilted to a negative tilt angle to align with shading lines at seasons where solar path is low to avoid shading of photovoltaic arrays of the first group, and tilted to face the sun during seasons of high solar path to increase collection of solar energy, thereby increasing land coverage ratio of said photovoltaic system.

2. The photovoltaic system of claim 1, wherein said photovoltaic arrays of the first group being arranged with tilt angle and distance between them in accordance with latitude location, solar path and weather conditions associated with location of the photovoltaic field.

3. The photovoltaic system of claim 1, wherein said photovoltaic arrays of said first group having length along the orientation axis associated with two or more solar panels, photovoltaic arrays of said second group having length along the orientation axis associated with two or less solar panels.

4. The photovoltaic system of claim 1, wherein photovoltaic arrays of said second group are mounted separately from photovoltaic arrays of said first group being located between photovoltaic arrays of said first group with respect to the orientation axis of the system.

5. The photovoltaic system of claim 4, wherein mounting arrangement of photovoltaic arrays of said second group comprise at least one pivot located at a solar facing edge of said photovoltaic module.

6. The photovoltaic system of claim 4, wherein mounting arrangement of photovoltaic arrays of said second group comprise at least one pivot located at central region of said photovoltaic module.

7. The photovoltaic system of claim 1, wherein photovoltaic arrays of the second group are mounted with corresponding photovoltaic arrays of the first group on a common frame, said photovoltaic arrays of said second group being mounted on a pivot on solar opposing edge of corresponding photovoltaic arrays of the first group.

8. The photovoltaic system of claim 1, wherein said photovoltaic arrays of said second group are mounted on telescopic support structure and configured to selectively vary height of solar panels mounted thereon.

* * * * *